United States Patent [19]

Kim et al.

[11] Patent Number: 5,124,192
[45] Date of Patent: Jun. 23, 1992

[54] PLASTIC MOLD STRUCTURE AND METHOD OF MAKING

[75] Inventors: Bang M. Kim; Matthew F. Niemeyer, both of Schenectady; Donald F. Foust, Scotia, all of N.Y.

[73] Assignee: General Electric Company, Schenectady, N.Y.

[21] Appl. No.: 437,051

[22] Filed: Nov. 15, 1989

[51] Int. Cl.⁵ .................. B32B 7/02; B32B 15/08
[52] U.S. Cl. .................................................. 428/215
[58] Field of Search ............ 428/461, 422, 458, 215, 428/325, 323, 463, 473.5; 528/229; 264/45.5; 564/315; 404/111; 204/30

[56] References Cited

U.S. PATENT DOCUMENTS

| | | | |
|---|---|---|---|
| 3,734,449 | 5/1973 | Itou et al. | 249/114 |
| 3,988,403 | 10/1976 | Angell, Jr. et al. | 404/111 |
| 4,018,552 | 4/1977 | Prast et al. | 425/407 |
| 4,111,906 | 9/1978 | Jones et al. | 528/229 |
| 4,201,742 | 5/1980 | Hendry | 264/45.5 |
| 4,203,922 | 5/1980 | Jones et al. | 564/315 |
| 4,225,109 | 9/1980 | Yotsutsuji et al. | 249/111 |
| 4,775,449 | 10/1988 | Dumas et al. | 204/30 |
| 4,842,946 | 6/1989 | Foust et al. | 428/458 |

FOREIGN PATENT DOCUMENTS

2319477 2/1977 France.

OTHER PUBLICATIONS

Metal Finishing 57th Guide-Book, Directory Issue 1989, pp. 170-171.
Aluminum-Preplate Surface Conditioning for Electroless Plating, pp. 1-7, Ethone Company Literature.
ENPLATE NI-424, Ethone Company Literature.

Primary Examiner—Thomas J. Herbert, Jr.
Attorney, Agent, or Firm—Patrick R. Scanlon; James C. Davis, Jr.; Paul R. Webb, II

[57] ABSTRACT

A metal mold core which is partially insulated includes a metal continuous hard skin layer over the core and over the insulation to avoid discontinuity caused delamination in the presence of flowing injected plastic. The skin layer includes abrasion resistant nickel deposited over electroytically and electrolessly deposited copper applied over an interface metal layer on the core. The insulation layer includes multiple layers of a polyimide resin one of which layers includes glass micro spheres for decreasing the thermal conductivity to increase its insulation property and for decreasing the coefficient of thermal expansion (CTE) of the insulation to more closely match the core CTE to further preclude delamination in the presence of temperature excursions.

19 Claims, 4 Drawing Sheets

PLASTIC MOLD STRUCTURE AND METHOD OF MAKING

The present invention relates to structures and method of making thereof for molding plastic materials.

Of interest are the following copending applications: Method for Preparing Metallized Polyimide Composites, by Foust et al., Ser. No. 402,372 filed Sep. 25, 1989; Multilayer Composite Mold Structure for Molding on Hot Surfaces, by B.M. Kim, Ser. No. 175,078, filed Mar. 30, 1988; Method for Treating Polyetherimide Substrates and Articles Obtained Therefrom, by Foust et al., Ser. No. 331,715, filed Apr. 3, 1989; Apparatus for Blow Molding Parts with Smooth Surfaces, by B.M. Kim, Ser. No. 250,806, filed Sep. 29, 1988; Reinforced Composite and Method of Manufacture, by Kim et al., Ser. No. 135,762, filed Dec. 21, 1987; all of the above being assigned to the assignee of the present invention.

Incorporated by reference herein are U.S. Pat. Nos. 4,111,906 and 4,203,922, both in the name of Jones et al.and U.S. Pat. Nos. 4,775,479 and 4,842,946, both in the name of Foust et al., the latter two being assigned to the assignee of the present invention.

As disclosed in several of the aforementioned applications, for example, Ser. Nos. 250,806 and 175,078, recent improvements in the molding of plastic parts include providing a multilayer composite mold structure in which a thermally conductive core, e.g., a metal, is covered with an insulting layer, e.g., a thermoplastic, over which a hard skin metal layer is formed for providing improved surface characteristics to the molded plastic parts. The purpose of the insulating layer is to slow the cooling of the thermoplastic material sufficiently so that heat from the plastic material remains at the plastic material surface for a time period sufficient for voids, die lines, folds and other surface defects to be removed as the plastic material cools. Otherwise, the plastic material which comes in contact with the relatively cool surface of the mold core quickly freezes and surface defects are frozen in place at the molded component surface.

Blow molding and compression molding processes disclosed in the aforementioned copending applications Ser. Nos. 250,806 and 175,078 employ plastic material which is relatively static with respect to the mold surfaces. In certain molding applications, for example, injection molding, the plastic melt front of the softened plastic material flows over the mold surface during the molding process. Such injection molding processes may include injection of neat resins or foamed resins. In either case, the molten resins flow in a melt front over the mold surface during the mold procedure.

The present inventors recognize that a problem exists in injection molding processes employing thermal insulation layers of the type discussed above. In particular, insulation delamination may occur at the interface between the insulation layer and the mold core. In cases where a metal skin is employed over the insulation layer to improve the surface characteristics of the finished part delamination may occur at the interface of the metal skin and the underlying insulation layer or at the interface of the insulation layer and core, or both. Typically, the insulation layer and overlying metal skin are adjacent to the gate area at which the pressurized soft heated plastic material is injected into the mold. The present inventors believe that delamination occurs because of the surface discontinuities between the different materials and due to differences in coefficient of thermal expansion (CTE) of the different materials, e.g., plastic insulating layers typically have a higher CTE than the core, typically an iron or aluminum alloy.

As part of the above problem, the present inventors recognize a need in an injection molding environment for providing enhanced surface characteristics to a portion of a finished part to be molded without the discontinuity caused delamination. In this case, the present inventors recognize a need for a mold structure, whose surface is contoured to form the finished part, need only have a portion thereof insulated to slow the cooling of the plastic material at that portion. The remaining portion of the finished part surface need not be enhanced adjacent to that portion. The problem of delamination may also occur when only a portion of the mold core surface is insulated as compared to prior art systems where an entire mold surface is insulated.

In accordance with one aspect of the present invention a mold surface for forming a plastic part has a portion thereof formed with an insulation layer. In accordance with a second aspect of the present invention, in a mold in which a surface thereof includes an interface between the mold core and an insulation layer, a continuous skin layer is over both the insulation layer and the core so as to substantially eliminate discontinuities in the surface of the mold core to thereby substantially avoid delamination in the presence of a moving plastic wave front.

In accordance with one embodiment of the present invention, the insulation layer comprises a high temperature resistant polyimide. In a further embodiment, the polyimide comprises a partially fluorinated polyimide. One example of the partially fluorinated polyimide includes a partially fluorinated aromatic diamine which is the condensation reaction product of substantially equal molar amounts of one of pyromellitic dianhydride (PMDA) or benzophenone tetracarboxylic acid dianhydride (BTDA) in an N-methyl pyrrolidone (NMP) with an aromatic diamine structure as follows:

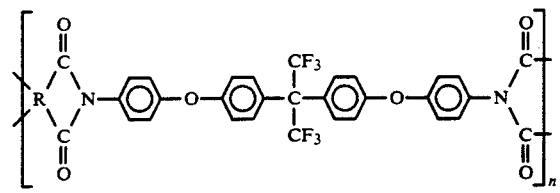

where n is an integer sufficient to provide a structure having an average molecular weight of at least 5000 and R is an organic radical of 5 to 22 atoms selected from the group consisting of tetravalent aliphatic radicals and tetravalent aromatic radicals. Where the mold core is metal, depending on the substrate core metal material employed in a given mold, one or more layers of metals are applied to the mold to protect the mold from corrosion for the purpose of electrolessly depositing a metal skin layer over the partially fluorinated polyimide insulation layer.

In one feature of the present invention the thermal coefficient of expansion of the insulating polyimide layer is decreased to more closely match the thermal coefficient of expansion of the mold core while decreasing its thermal conductivity by the addition of insulating glass hollow microspheres. In a further feature, the latter layer is followed by a layer of a polyimide without the spheres to form a relatively smooth mold surface. In accordance with a still further feature, the surface of the polyimide is modified to improve its adhesion characteristics for the subsequent metal skin layer applied over the insulation layer.

BRIEF DESCRIPTION OF THE DRAWINGS

In FIG. 1, a mold 10 forms a pair of articles (not shown) from heated soft plastic material injected from a source 12 through a gate 14 into first and second mold cavities 16 and 18. The injected plastic may be a foamable, thermoplastic material. Cavities 16 and 18 and gate 14 are formed in part by an upper mold half core 20. A mating lower mold half core 22 completes the formation of the cavities 16 and 18 and a sprue cavity 21. Cavity 16 is also defined by an end wall 24 in mold core 20 and by central core mass 26 forming gate 14. Cavity 18 is formed by mass 26 and by a second end wall 28. In a preferred embodiment, the mold 10 formed by mold cores 20 and 22 are aluminum or iron alloys, for example, tool steel. The lower mold core 22 includes cooling conduits 32 for receiving a cooling fluid which maintains the mold core 22 at a constant mold temperature typically in the range of 175° F.–250° F. which is below the glass transition temperature or melt temperature of the plastic material 48. The mold halves may be made of other highly thermally conductive materials.

Figure 1:
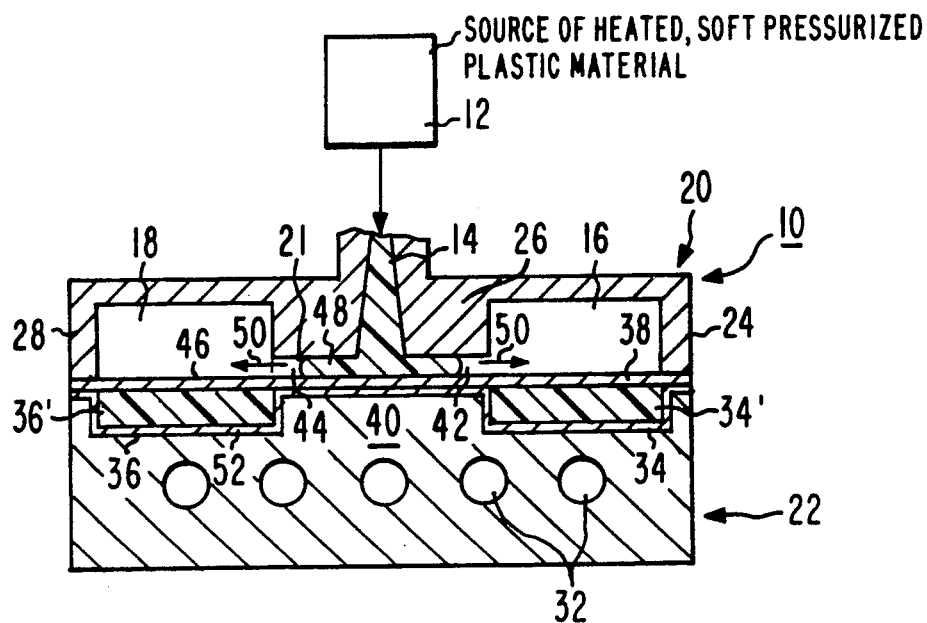
FIG. 1 is a sectional; diagrammatic elevation view of an injection molding apparatus for molding a plastic material in accordance with one embodiment of the present invention.

Lower mold core 22 includes a thermal insulation layer 34' bonded to core 22 in recess 34 and a second insulation layer 36' bonded to core 22 in recess 36. A hard metal skin layer 38 is deposited over the insulation layers and over core 22 in region 40 in sprue cavity 21. Cavity 21 is formed by land region 40 over core 22 spaced from and juxtaposed with mass 26. The metal skin layer 38 covers the lower mold core 22 forming a continuous planar mold surface 46. While surface 46 is planar in this embodiment, it could be contoured in other ways in other implementations. The mold surface 46 has no discontinuities present throughout the mold cavity region formed by cavities 16, 18 and 21. Cavity 21 has two injection ports 42 and 44 which receive the pressurized wave front of flowing hot plastic from the source 12 via gate 14. The plastic material may be thermoplastic, foamed thermoplastic or thermosetting plastic materials with or without fillers.

The present embodiment will be discussed with respect to employing mold 10 for forming injection foamed thermoplastic materials. However, it should be understood that the various parameters of the mold may be changed in accordance with the desired given material to be molded whether it be thermoplastic or thermosetting. The changing of the parameters of the mold is within the skill of one of ordinary skill in the plastic molding art. For example, the mold may be one for use with compression or blow molded components.

The heated plastic material is injected in direction of arrows 50 into the respective cavities 16 and 18 flowing in intimate contact over the surface 46 of the metal layer 38. Because there are no discontinuities in the metal layer 38, the prior art problem of delamination which might otherwise occur in the presence of such discontinuities is avoided. Further, to minimize delamination due to differences in CTE of the different materials, the relatively higher CTE of prior art insulation materials is changed to more closely match the CTE of layers 34' and 36' to that of the core 22. This will be explained below.

The metal layer 38 is formed over the entire region of the mold core surface 46 and also may include the end regions of surface 46 in contact with the upper mold halve core 20 at walls 24 and 28. This avoids the generation of any potential discontinuity within the mold cavities 16 and 18 on the surface 46. Employing the structure disclosed, the insulation layers, 34' and 36' need not extend throughout the entire surface region of the lower mold halve 22 to avoid the problems of discontinuities. In this case, the insulation layers 34' and 36' are disposed in respective recesses 34 and 36 in the lower mold core 22. The metal layer such as layer 38 is then bonded over the insulation regions and over the core surface at the central region 40 in sprue cavity 21 without an insulation layer beneath the gate 14 to form a continuous, planar mold surface.

In a preferred form, the metal layer 38 includes a layer of electrolessly deposited metal which adheres to the insulation layers 34' and 36' when these layers are made of thermoplastic or thermoset materials. A metallized layer 52 is initially bonded to the core in the recesses 34 and 36 and over the core 22 surface beyond the recesses. The layer 52 assists in enhancing the bonding of the metal layer 38 to the core 22, and in the case of an iron alloy core, for protecting the core 22 from the corrosive effects of a corrosive acid bath in the electroless plating sequence. This is described in more detail in connection with a tool steel core, FIG. 2, and an aluminum core, FIG. 3.

Figure 3:
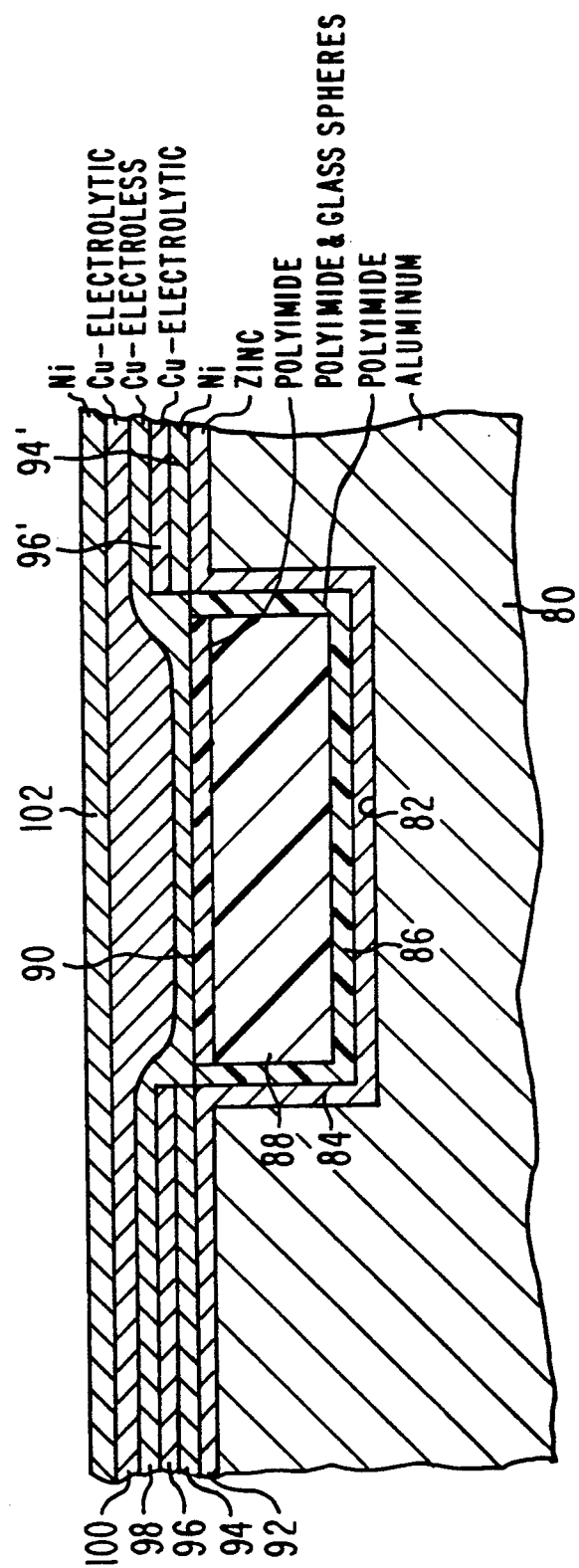
FIG. 3 is a sectional elevation view of a second embodiment employing an insulation layer in combination with an aluminum mold core.

In the more generalized embodiment of FIG. 1, the insulating layers 34' and 36' are illustrated covering the portions of the core 22 over the entire surface region of one surface of the respective cavities 16 and 18. Each of the surface regions of the layers form one surface of a side of an article to be formed by the mold 10. However, in the alternative, it may be desired to form a smooth surface finish over only a portion of one side of the article to be formed. In this case, only a portion of the core 22 surface in cavities 16 and 18 may be provided with an overlying insulation layer. The remaining portion of the mold surface in each of cavities 16 and 18 may be directly thermally conductively coupled to core 22. This is illustrated in the embodiment of FIG. 3 which will be discussed later.

If it should be desired to provide a smooth glossy or textured finish to only a portion of one surface of an article to be formed, the insulation layer in cavity 16 or in cavity 18 may be juxtaposed adjacent to any portion of surface 46 to provide a particular design effect or surface characteristic differential on one side of the article to be formed. The important aspect is that the metal layer 38 is continuous throughout that one side of the cavities 16 and 18 and the gate region adjacent region 40 for providing a surface without discontinuities to preclude delamination as a result of the flowing melt mass of the injected plastic material 48. In compression or blow molding, however, the need for a continuous hard skin layer is not essential in the absence of a flowing hot plastic melt mass. Here, where it is desired to impart a design effect on a portion of an article surface, the insulation layer is formed in the lower core, for example, over the desired portion of the mold cavity.

The cores 22 and 20 comprise the same thermal high thermally conductive material. The insulating layers may be fabricated from low thermally conductive material such as plastics, plastic composites, porous metals, ceramics and low conductivity metal alloys. While the hard skin layer 38 comprises a metal layer in this embodiment, it may, in certain implementations, be a ceramic or other hard solid material which provides the necessary mechanical strength while imparting a smooth surface to the object being molded. The layer 38 may be applied, for example, by lamination, deposition or sintering. The high thermally conductive cores 22 and 20 provide good heat transfer to and from the insulating layers. Reference is made to copending application Ser. Nos. 402,372 and 175,078 which are incorporated by reference herein and described in greater detail the general deposition of layer 38. As discussed in Ser. No. 175,078, layer 38 may be produced by chemical deposition or plasma deposition of a 10 to 100 mil thickness on a graphite part replica. The mold halves are positioned on either side of the graphite part, and the graphite replica is then removed and the two mold halves remain.

In the embodiment of FIG. 1, the insulation layers 34' and 36' may be made of epoxy, polytetrafluoroethylene, polysulfone, polyamides, polyamideimides, polyimides, with or without fillers, thermoplastics or thermoset plastics. The insulation layers may be formed by dipping, brushing, spraying, casting, chemical vapor deposition, or electro-organic synthesis. The metal hard skin layer 38 may be deposited by electro-deposition, chemical vapor deposition or spraying. The layer 38 may have a thickness in the range of 0.1 to 5 mils. The insulation layer 34' preferably may have a thickness of 2 to 20 mils. The metal layer 38 in a preferred embodiment, may include a top layer of nickel to withstand the abrasive wear of the flowing melt front from the injected plastic 48.

Figure 2:
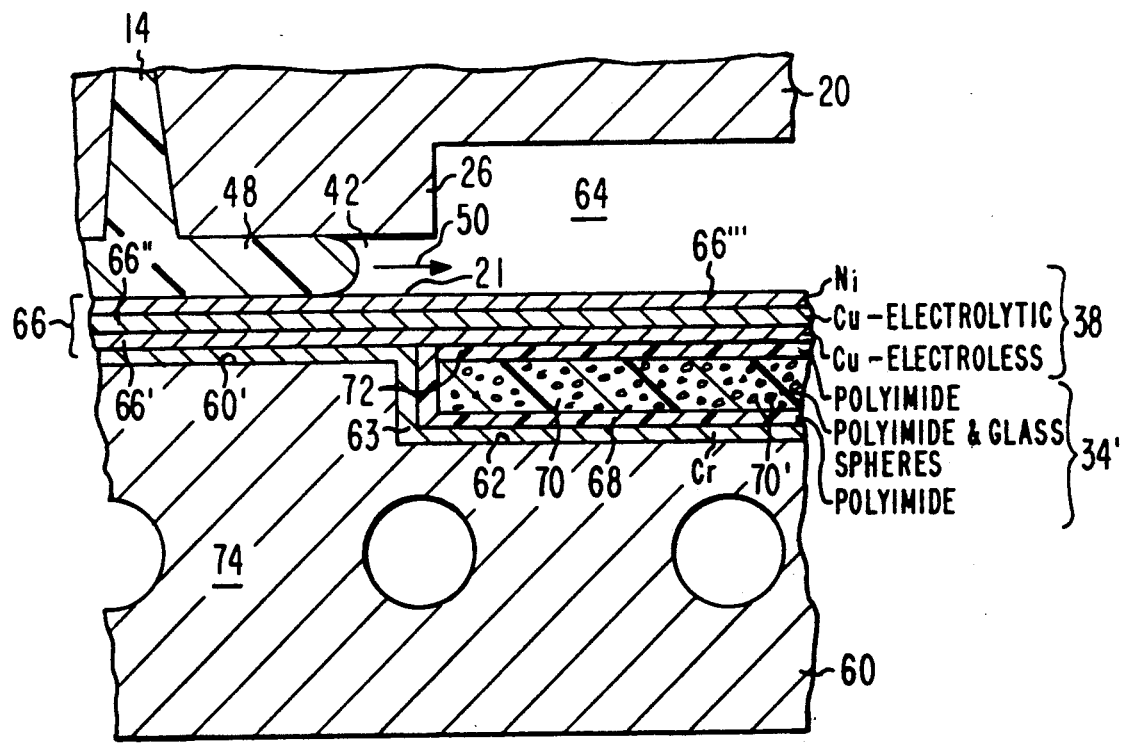
FIG. 2 is a more detailed sectional elevation view of a portion of the view of the embodiment of FIG. 1 to show metallization layers employed with a steel mold core.

In FIG. 2, upper core 20 and lower core 60 are formed of tool steel. Core 60 has a rectangular in section recess 62. The recess 62 is juxtaposed with one entire surface of an article to the molded in cavity 64. Hot, injected softened pressurized plastic material 48 has a wavefront which flows in directions 50. A layer 63 of chromium is bonded to core 60. The layer 63 of chromium is electrolytically deposited over the core and exhibits good adhesion to the core. The chromium layer also serves as a barrier to the corrosive effects of acid employed in the deposition of hard skin layer 66. The surface of the core 60 is cleaned in an acid bath as is conventional for chromium deposition processes as known in the plating art. The chromium layer 63 may have a thickness in the range of 1 to 3 mils and preferably about 1 mil.

A thermoplastic polymer commercially available as a polyimide resin available from Ethyl Corporation under the Trademark EYMYD is deposited in three layers 68, 70 and 72 in recess 62. The EYMYD resin is a polyamic acid in a 1-methyl-2-pyrrolidone (NMP) solvent. It is a brown, varnish-like solution. Solvent evaporation and curing result in formation of a fluorine containing thermoplastic polyimide. Applying the EYMYD resin to surface followed by solvent removal and curing produces a high quality polyimide coating with excellent thermal, oxidative stability, adhesion, and frictional wear. This resin is referred commercially by the designation L-20N and L-30N. Typical physical properties of the L-30N resin include polyamic acid, 25 percent by weight, polyimide, 26 percent by weight (after cure), boiling point 203° C., density at 20° C. of 1.13 g/ml and a flashpoint 96 PMCC/ASTM, D93, ° C. The resulting polyimide resin has a glass transition temperature $T_g$ of 750° F., a density of 1.45 at 20° C. G/ml, a coefficient of thermal expansion of $3.6 \times 10^{-5}/°$ C., and a thermal stability of 700° F. of five percent weight loss after 100 hours. The polyimide is cured at 465° F. (240° C.) for two hours followed by post-cure at 675° F. (357° C.) for two hours. The resin L-30N can be diluted to a sprayable solution for spray coating by diluting the solution with MEK (methylehtylketone) 95 percent by weight and NMP five percent by weight. An L-30N based coating adheres tenaciously to other polyimides, epoxy, graphite, aluminum, copper, titanium, inconel and glass. It retains 100 percent adhesiveness to titanium and aluminum after 1000 hours at 600° F. (315° C.). It retains 100 percent adhesion to aluminum after two hours 750° F. (399° C.)'and has over four times the abrasion resistance compared to other commercial polyimides based on Tabor abrasion tests.

The L-20N and L-30N resins are derived from a four-ring aromatic diamine designed 4-BDAF which diamine has the following structure:

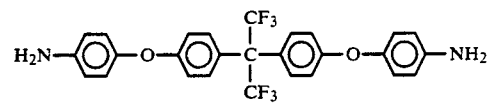

This diamine is reacted at a 1:1 molar stoichiometry with pyromellitic dianhydride (PMDA) to form the L-30N resin in an N-methyl pyrrolidone (NMP) or is reacted at 1:1 stoichiometry with benzophenone tetracarboxylic acid dianhydride (BTDA) in an N-methyl pyrrolidone (NMP) to form the L-20N resin. A representative chemical structure for the EYMYD resin follows:

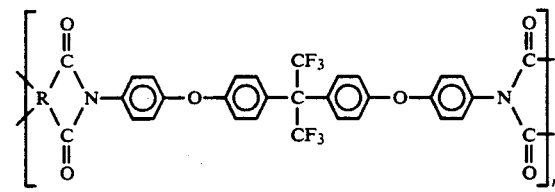

where n is an integer sufficient to provide a structure having an average molecular weight of at least 5000 wherein R is an organic radical of 5 to 22 atoms selected from the group consisting of tetravalent aliphatic radicals and tetravalent aromatic radicals.

These resins are described more fully in U.S. Pat. Nos. 4,111,906 and 4,203,922, both of which are incorporated by reference herein. The EYMYD polyimide polymers are thermoplastic in structure and behavior.

Reference is made to SAMPE Journal, Volume 25, No. 2, March/April 1989 for further description of the EYMYD polyimides.

Figure 4:
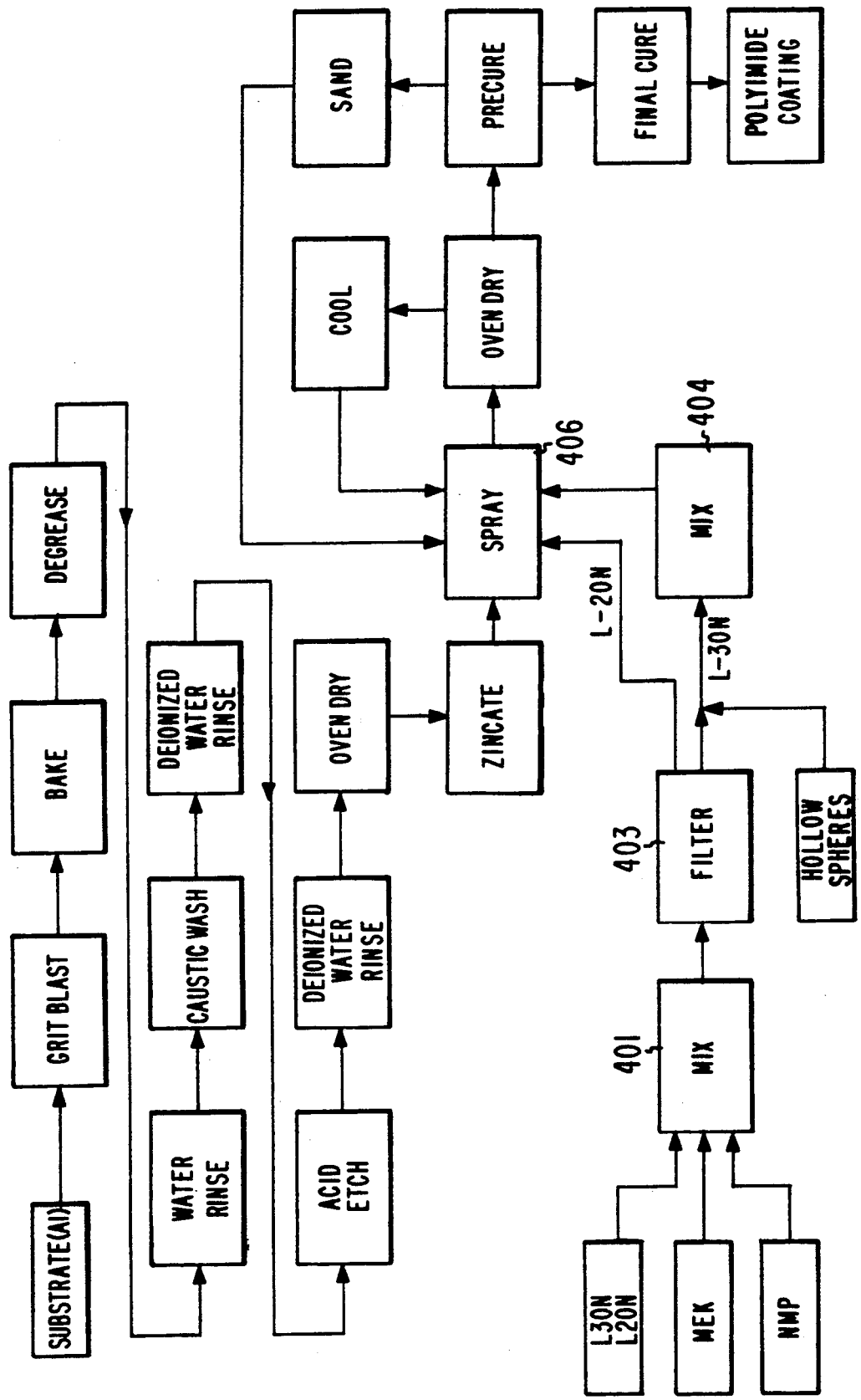
FIG. 4 is a schematic block diagram of process for coating a polyimide insulation layer on the cores of the embodiments of FIGS. 1, 2, and 3.

It is preferred that the polyimide layer 68 comprise the L-20N resin to provide good adhesion to the chromium layer. It is believed that the L-20N has improved adhesion as compared to the L-30N resin. In FIG. 4, the L-20N resin is mixed at step 401 with solvents MEK and NMP to 5-7% solids, filtered by media vacuum filter with 15μm retention at step 403 and then sprayed on the chromium layer at step 406 to a thickness in the range of 1 to 3 mils. The resin is applied to 0.5 to 0.8 mil thick layers, dried for 15 minutes at 225° F., and then cooled to a temperature lower than 150° F. Further coatings of the same 0.5 to 0.8 mil thickness are applied, dried and cooled up to a thickness of about 1.5 to 2 mils. The layer 68, FIG. 2, is deposited over all of the walls of recess 62 previously coated by the chromium layer. It should be understood that the chromium layer in the recess 62 is optional, the chromium being required primarily in region 74 outside of the recess 62 to protect the core 60 from e subsequent electroless plating bath corrosive effects. The layer 68 is made sufficiently thick to form a good adhesive bond with the subsequently applied polyimide layer.

After the layer 68 of polyimide is applied, a layer of polyimide 70 having a filler of glass spheres 70' is then coated over the layer 68. Layer 70b comprises the L-30N resin employing a filler of hollow borosilicate micro glass spheres 70'. The hollow glass spheres 70' have a mean particle size of less than 62 microns and, preferably, provide a pigment volume content of about 20%. This is to provide the desired thermal conductivity of about $5 \times 10^{-3}$ to $1 \times 10^{-4}$ cal/cm sec. ° C. to the insulating layer 70 as compared to the thermal conductivity of the core in a range of about $1 \times 10^{-2}$ to $1 \times 10^{-1}$ cal/cm. sec. ° C. The volume content of spheres and their size may differ depending on the insulation effect desired. The glass spheres may be obtained from the PQ Corporation having a designation Q-CEL ® 600. The Q-CEL ® 600 borosilicate glass micro spheres are a free flowing, white powder having an untamped bulk density of 0.18-0.22 g/cm$^3$, with a true density of 0.41-0.45$^3$, and a mean particle size of 62 μm in a range of 5-100 μm.

In FIG. 4, the L-30N polyamic acid resin is mixed in a mixer at step 401 with MEK and NMP solvents at a 5:19:1 ratio, respectively. The resulting mix comprises 5-7 percent solids. The mix is then applied to the media vacuum filter having the 15 micron retention for filtering out micron size particles at step 403. The hollow glass spheres are then applied to the filtered L-30N solvent mix to a mixer, step 404. The mixer at step 404 blends the mix with a magnetic stirrer for one hour without producing significant air bubbles. The mixed solution is sprayed at step 406 for spraying a coating thickness in successive steps in the range of 0.5 to 0.8 mils as discussed above in connection with the application of the L-20N layer 68.

The coating is then dried 15 minutes at 225° F. in an oven and cooled to less than 150° F. in repetitive cycles until a thickness of 4-5 mils is reached. Then the coating is precured for one hour at 465° F. and sanded smooth for several minutes with a 222 to 600 grit sandpaper. The sanded coating is then recoated at the spray step 406 with additional 0.5 to 0.8 mil thick coatings in repetitive cycles in the oven dry and cooling process discussed above until an additional 4-5 mils thickness is reached. The coating is again precured and sanded and the repetitive cycles repeated until the desired thickness is reached to produce the polyimide layer 68 of L-30N, FIG. 2.

The hollow spheres provide two advantages to the polyimide layer. The spheres decrease the coefficient of thermal expansion of the resulting layer so that its coefficient of thermal expansion more closely matches that of the core and, at the same time, increase the thermal insulating properties of layer 70. The hollow spheres also decrease the shrink down of the coated material upon solvent removal and imidization. The thermal conductivity of the EYMYD L30-N layer is (without the glass filler) about 0.10 to 0.002 times that of conductive core and generally approximately 0.15 BTU/hour. ft. ° F. ($6.12 \times 10^{-4}$ cal/cm. sec °C.) and has a coefficient of thermal expansion (CTE) of $18 \times 10^{-6}$ in/in ° F. to $20 \times 10^{-6}$ in/in ° F. ($32.4 \times 10^{-6}$ cm/cm ° C. to $36 \times 10^{-6}$ cm/cm ° C.). Carbon steel in comparison has a CTE of $6 \times 10^{-6}$ in/in ° F. to $7.5 \times 10^{-6}$ in/in ° F. ($10.8 \times 10^{-6}$ cm/cm ° C. to $13.5 \times 10^{-6}$ cm/cm ° C.) and aluminum has a CTE of $11.5 \times 10^{-6}$ in/in ° F. to $13.5 \times 10^{-6}$ in/in ° F. ($20.7 \times 10^{-6}$ cm/cm ° C. to $24.3 \times 10^{-6}$ cm/cm ° C.). The addition of the glass spheres reduces the CTE of the L-30N too so that it more closely matches the CTE of the aluminum and carbon steel. By closely matching the CTEs of the layer of the insulation to that of the core metal potential delamination of the insulating layer due to differences in CTE during temperature cycling is minimized.

Because the polyimide and glass sphere insulating layer 70 may have a surface roughness induced by the glass sphere filler, FIG. 2, an additional layer 72 of polyimide L-30N without a filler is added over layer 70. The layer 72 may have a thickness of 1 to 3 mils. When the final desired thickness of the polyimide is reached, the coating is precured for 2 hours at 465° F. and then finally cured at 600° F. for 2 hours. Layer 72 is also sprayed on employing the process described above for layer 68 in connection with FIG. 4. The insulation layer comprises layers 68, 70 and 72 have a combined thickness of 2 to 20 mils for use in an injection molding process for foam molding thermoplastic materials.

The hard metal skin layer 66 preferably comprises a layer 66' of electrolessly deposited copper deposited over the polyimide layer 72 and an electrolytic layer 66" of copper deposited on the electrolessly deposited copper and then a final layer of 66''' nickel deposited over the electrolytic copper layer. The electroless copper is deposited on the polyimide because of the electrical insulating properties of the polyimide preclude an electrolytical deposition thereon. The electroless copper is deposited on the polyimide surface and on the surface of the chromium layer in region 74. It should be understood that the electroless deposited layer is deposited over the entire surface 60' of the mold core 60 forming the one half of the mold throughout one or more of the cavities such as cavity 64, the gate 14 region and sprue cavity 21. However, to electrolessly deposit the copper layer on the polyimide layer 72, the surface of the polyimide layer 72 is modified to improve its adhesion characteristics. The modification of the surface of the polyimide is performed with a procedure described in the aforementioned copending applications Ser. Nos. 331.715 and 402,372.

As described in copending application Ser. No. 331,715, the polyimide can be initially degreased with a degreasing agent such as a detergent, or a suitable organic solvent, such as a halo hydrocarbon, for example, a Freon solvent, such as 1,1,2-trichlorotrifluoroethane. The expression "degreased" means that the surface of the polyimide is free of oil, molding components, finger prints and extraneous material. After the initial degreasing step, the polyimide can be modified with concentrated sulfuric acid. The expression "modified with sulfuric acid" means treating the surface of the polyimide, by immersion, spraying, painting, or other forms of surface treatment with an aqueous solution of sulfuric acid having a concentration of from 80% to 99%, at a temperature of 0° C. to 85° C. for from 10 seconds to 30 minutes.

A residual film of different thicknesses is formed on the polyimide surface during the sulfuric acid treatment. the film may remain on the surface of the polyimide even after rinsing. The film can be treated with an aqueous base of pH greater than 14, such as an aqueous basic solution 0.1M to about 10M of an alkali metal hydroxide, such as sodium hydroxide or potassium hydroxide. In addition to the alkali metal hydroxide, there is included tetramethyl-ammonium hydroxide. The aqueous base hydroxide treatment preferably is effected at room temperature. A water rinse can be used if desired.

The surface of the resulting polyimide is immersed into an aqueous solution of an alkali metal hydroxide and alkali metal permanganate at a temperature of 25° C. to 85° C. for a period of 2 to 20 minutes. To remove the residue, the use of an alkali metal hydroxide, as previously defined, with the alkali metal permanganate is optional. The permanganate oxidizing solution can contain from 1 to 75 grams of the alkali metal permanganate, per liter of solution for effective results. The substrate can then be removed from the bath for a water rinse. The rinse can be effected by immersing the treated substrate in water, or by spraying or brushing. The alkali metal permanganate preferably includes potassium or sodium permanganate.

Following the water rinse, a brown manganese containing film is present on the surface of the rinsed polyimide substrate. The polyimide is then treated with a reducing agent such as an aqueous solution hydroxylamine hydrochloride by immersing the polyimide coated substrate into the reducing bath. Additional reducing agents which can be used are for example 1 to 10% of stannous chloride in 5% HCl, an aqueous solution of 1 to 30% by weight of hydrogen peroxide, Shipley Circuposit MLB Neutralizer 216, a combination of surfactant and reducing agent, e.g., hydroxylamine hydrosulfate, a 1 to 30% solution of sodium bisulfite, etc. The resulting polyimide substrate is rinsed and allowed to dry to form a polyimide substrate having a chemically altered surface rendering it hydrophillic, i.e., good wetting for later Cu deposition. In addition, it has a slightly higher $\equiv$C—O— content possibly indicating increased formation of carboxylic acid, ether, and/or alcohol groups. Its modified surface is capable of being activated (capable of being plated) even after an extended period of time with a tin-palladium colloid, a plating catalyst in a standard manner and metallized with a electrolessly deposited metal such as copper. Superior adhesion between the deposited metal and the polyimide surface is achieved.

It is often useful to begin activation of the substrate by treatment with an additive which aids in absorption of the plating catalyst. Such additives are well-known in the art. Exemplary aids to catalyst absorption include Shipley 1175A, cationic surfactants, a product of the Shipley Company, and Metex 9420, a product of MacDermid Corporation. Immersion in about 0.1% to about 5% by volume of either of these agents in water for about 1 minute to about 10 minutes at a temperature of from 40° C. to about 80° C. is usually sufficient. Although such a treatment is not deemed critical, its use often enhances the uniform deposition of electrolessly applied metals onto the substrate.

Activation of the polyimide substrate for plating purposes can be achieved by known methods. For example, the substrate may be contacted with an acid solution of a precious metal, such as palladium chloride in hydrochloric acid, for a period of time sufficient to cause catalytic activation of the substrate surface.

One illustrative activation technique involves immersing the substrate for one minute at room temperature in a solution of Shipley Cataprep ® 404, a product of the Shipley Company, which is a concentrate comprising a white granular blend of acidic salts having a 1% solution pH of about 2. This solution provides a protecting agent for the plating catalyst subsequently applied. The substrate may then be immersed for three minutes at 44° C. in a plating catalyst solution of Shipley Cataposit ® 44, which contains 10% by weight hydrochloric acid, 22% by weight tin, and about 4.7 g/l palladium, which is the electroless plating catalyst and has a specific gravity of about 1.2. After a water rinse, the substrates are immersed at room temperature for three minutes in a solution of Shipley Cuposit ® Accelerator 19, a fluoroboric acid-containing a formulation used to separate tin from the plating catalyst.

Activation and plating processes are also described in U.S. Pat. Nos. 3,011,920 and 3,841,881, issued to Shipley and Feldstein et al., respectively, both of which are incorporated herein by reference. A water rinse generally follows the activation step.

After surface activation and rinsing, electroless plating follows. Illustrative metals use to form metallization layer include copper, palladium, nickel, cobalt, and gold. Copper is employed in this embodiment because it adheres to chromium and to nickel. Electroless baths are well-known in the art and are generally described in the *Kirk-Othmer Encyclopedia of Chemical Technology*, 3rd Edition, Volume 8 the contents of which are incorporated herein by reference. The contents of the bath and the particular plating parameters, e.g., temperature, pH and immersion time, will of course depend on the particular polyimide serving as the substrate, and also upon the particular metal being deposited thereon. Suitable copper plating baths include the Shipley Cuposit ® 250 system, Shipley Cuposit ® 251 system which include copper sulfate, sodium hydroxide, formaldehyde, EDTA and proprietary agents and Enthone ® 406 system. Immersion times, bath temperatures, and other operating parameters can be determined and controlled according to the manufacturers' suggestions. Those having ordinary skill in the plating arts will be able to determine the most appropriate plating procedure for a particular situation. In this embodiment, the plating is with Shipley Cuposit ® 251° F. at 48° C. for five minutes.

The copper coated polyimide is then subjected to heating after electroless deposition of the copper. Oven heating of the mold half, i.e., the substrate with the copper layer thereon is sufficient, although any heating method is suitable. Typically, this heating is carried out at a temperature ranging from about 50° C. to about 170° C. from about 5 minutes to about 120 minutes. Preferably the heating is at 100° C. for two hours. Although the mechanism is not understood, the heating appears to reduce the time required to attain optimal adhesion.

Another layer of metal, preferably copper, is applied on the surface, e.g., by electroplating. The above-described heat treatment can in some instances by omitted if a heat treatment is employed after the plating of more of the metal, as described below. However, preferred embodiments include the heat treatment prior to deposition of more of the metal. Most preferred embodiments include a heat treatment prior to the deposition of more of the metal (i.e., after the electroless deposition), along with another heat treatment after the final layer of metal has been applied, as described below.

Electroplating is the preferred application method for the second metal layer. The substrate is usually cleaned prior to immersion in the electroplating bath. The cleaning can be performed by rinsing the substrate with a dilute solution of a strong acid, such as 10% by weight sulfuric acid in water.

Electroplating baths are well-known in the art and are described, for example, in U.S. Pat. No. 4,555,315, incorporated herein by reference although the particular electroplating bath used is not critical. Furthermore, those skilled in the art appreciate that the particular bath contents will depend upon some of the factors considered for the electroless deposition of metal described above. Typically, the electroplating bath for copper is operated at a temperature ranging from about 16° C. (room temperature) at about 38° C., with a cathode current density in the range of about 1 amps/sq.ft. (ASF) to about 80 ASF. A description of baths for plating copper or various other metals is given in the Kirk-Othmer reference described above, in Vol. 8, beginning on page 826. Baths used to apply a layer typically include an aqueous acidic copper electrolyte such as those of the acidic copper sulfate or acidic copper fluoroborate type; halide ions, such as chloride and/or bromide ions; and various other components well-known in the art. The thickness of the second metal layer is preferably about 1μm–100μm and preferably is applied using a Lea Ronal Co. PCM plus system at room temperature at a current density of 30° A/ft$^2$.

The electrolytic bath for the electrolytic layer can be one of the conventional baths known in the art. These baths contain effective amounts of brighteners and levelling agents, as well as other additives, all of which are well known in the art and are described, for example, in *Decorating Plastics*, edited by James M. Margolis, Hanser Publishers, 1986; by J.D. and A.P. David in *Plating and Surface Finishing*, edited by Frederick A. Lowenheim, Third Edition, John Wiley and Sons, Inc.; and in the United Kingdom Patent application of D. Morrissey et al. GB2123036A. Examples of other chemical additives are stress relievers, depolarizers, plating suppressors, and wetting agents, as well as agents used for hardening and grain refining. Thus, the term "chemical additives" as used herein is meant to include any of the above-mentioned agents.

After deposition of the electrolytic layer, the substrate is rinsed again with water and then heated to further enhance adhesion of the metal layers to the substrate. A typical heat treatment for ths step can involve temperatures ranging from about 50° C. to about 150° C. for a time period ranging from about 1 hour to about 24 hours, but preferably at 100° C. for two hours.

The result of the electrolytic deposition is a smooth, bright metal layer characterized by a high level of adhesion to the polyimide substrate.

In a preferred embodiment, a mold prepared by the method will have an electroless metallization layer which is about 0.25 micron to about 2 microns thick and a electrolytically-applied layer having a thickness of about 50 microns. A layer of nickel is then electrolessly deposited over the electrolytically deposited layer of copper. The nickel provides the necessary abrasion resistance for the metal layer. The copper is first treated for two minutes μm 0.1% by weight palladium (II) chloride (PdCl$_2$) and 1% by volume hydrochloride acid at room temperature. This is followed by a two minute water rinse. The nickel layer is then deposited using a conventional plating bath, but preferably Enthone Enplate ® Ni-424 system at 85° C. for 8 minutes to a thickness in the range of greater than 1 μm. The coated substrate is then heated preferably at 110° C. for sixteen hours. The above deposits a nickel phosphorous alloy having negligible porosity. In the alternative, the process described in copending application Ser. No. 402,372 can be used to modify the surface of the polyimide for applying the described metallized layers.

In FIG. 3, a second embodiment is disclosed employing an aluminum core 80 having a recess 82 in which is a polyimide insulation layer 84 comprising three layers of polyimide as described above in connection with FIG. 2. Layer 86 comprises L-20N polyimide, layer 88 comprises the L-30N polyimide filled with glass spheres filler and layer 90 is L-30N polyimide without a glass filler. The thickness of the layers 86, 88 and 90 preferably are the same as described above in connection with the embodiment of FIG. 2. In FIG. 3, however, the aluminum is coated with a layer 92 of zinc which is covered by a layer 94 of nickel followed by a layer 96 of electrolytically deposited copper. The zinc layer may coat all of the core 80 surface including that of recess 82. However, the coating of recess 82 is optional. The layer 92 of zinc is applied through out the core in regions at least outside of the insulating layer formed by layer 86, 88 and 90. The entire mold cavity, gate region and sprue cavity region of the surface of the core 80 outside the insulation layers over the zinc coated layer 92 is coated with layers 94, 94' of electrolessly deposited nickel. It should be understood that the different thicknesses of the different layers in the drawing figures is exaggerated as the difference in layers is in microns and relatively insubstantial so that the final mold surface is substantially planar for molding purposes. The electrolessly deposited nickel layers 94 and 94' are then coated with respective electrolytically deposited copper layers 96 and 96'. A layer of electrolessly deposited copper 98 is over layers 96 and 96' and insulation layer 90. A layer 100 of electrolytically deposited copper is over layer 98. A layer of nickel 102 is then deposited over the copper layer 100 to form the final mold surface.

Figure 5:
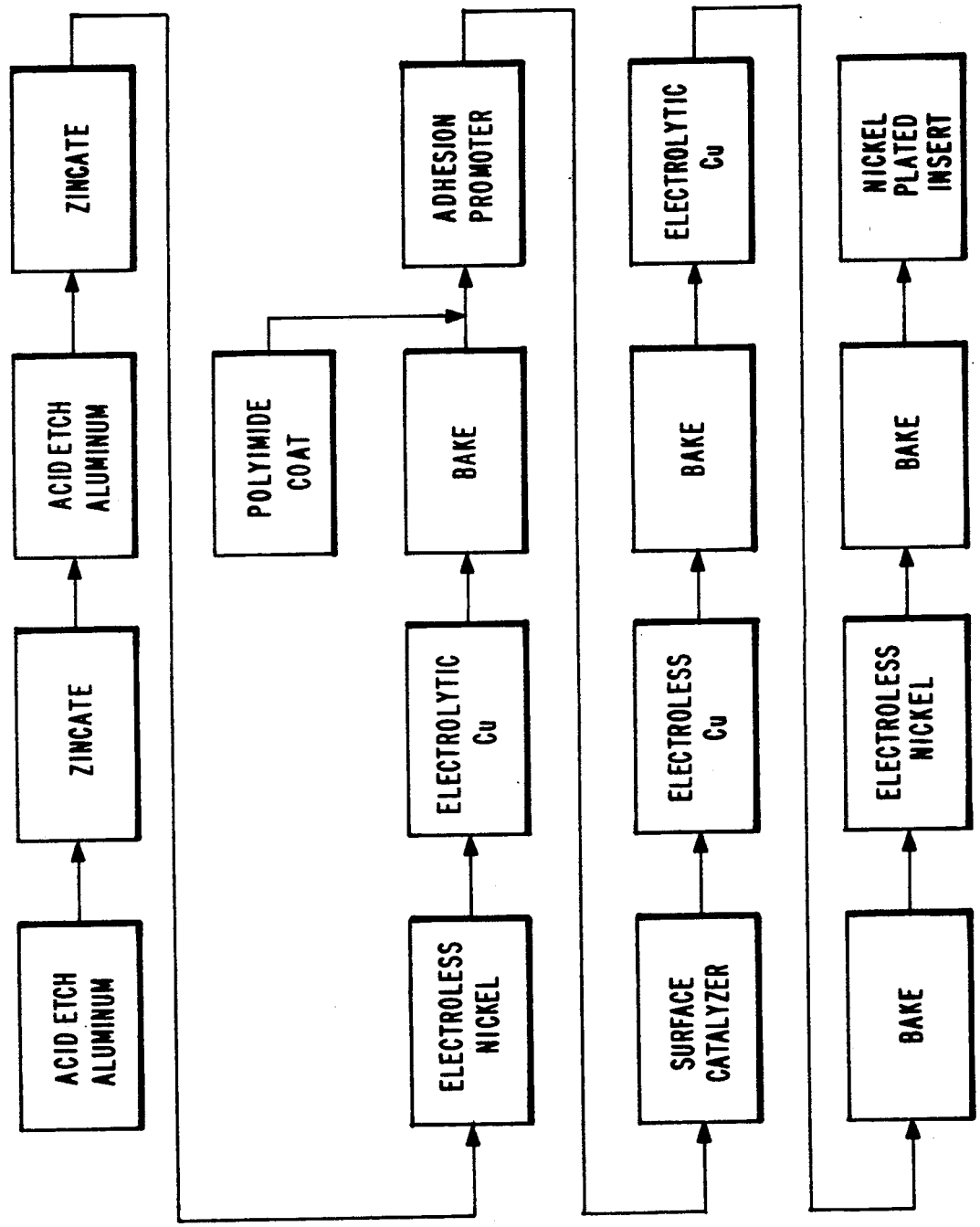
FIG. 5 is a block diagram of a process for applying metallization layers on the cores of the embodiment of FIG. 3.

The general process for processing the aluminum substrate is shown in FIGS. 4 and 5. In FIG. 4, the aluminum substrate is initially grit blasted with a grit of size 100. the aluminum core is then baked four hours at 700° F. to remove volatiles. The substrate is then degreased with a degreasing agent such as toluene for removing contaminants not removed by the previous baking process. This is followed by a water rinse and then a caustic wash with Alkonox which includes an alkaline detergent cleaning solution. The caustic wash is performed for 5 minutes and then rinsed with deionized water for about 5 to 10 minutes. The aluminum substrate surface is then acid etched with a chromic acid etch known as FPL. This etch includes a mixture of sulfuric acid and nitric acid at 100° F. for two minutes. FPL is a known sulfuric dichromic etch process developed by Forest Products Laboratories. This processes described in the Handbook of Surface Preparation by Richard C. Snogren, Palmerton Publishing Co. 1974, Chapter 7, pages 118 et seq. Reference is made to the above handbook for more detailed description of the FPL acid etch process. The substrate is then rinsed with the deionized water and oven dried at a temperature at less than 150° F. In FIG. 5, the surface after etch is then zincated with the known zincation process. The zincation process is described in more detail in a text *Metal Finishing*, a guidebook published by Metals and Plastics Publication, Inc., Hackensack, NJ, 13th Issue 1989, page 171. Preferably the entire mold surface of the aluminum core is zincated with a layer of zinc having a thickness of one micron to about 1 mil. As described in the above metal finishing guidebook, a double zincate process is employed in which a first zinc coating is followed by a 50 percent nitric acid solution to strip the zinc. Zinc is then applied as a second coat wherein the second coating is more uniform than the first. The zinc may be stripped employing sulfuric, nitric acid, or the etch employed prior to the zincation process.

After the second zincation coating is applied, a layer of electroless nickel is applied over the zinc layer in the regions outside of the recess 82, FIG. 3. This electroless deposited nickel layer forms layers 94 and 94'. The process for depositing the nickel is as described above in connection with the FIG. 2 embodiment. The nickel layer is applied because of its good adhesion properties to the zinc layer. The electroless nickel layer can be applied by any known process and, for example, a process described in general literature made available by the Enthone Company on the plating of aluminum. As described therein, the pretreatment process for aluminum alloys prior to electroless nickel plating involves the steps of cleaning to remove organic surface contamination, etching to eliminate solid impurities, desmutting to remove residues and alloying constituents remaining from the etching process and applying a barrier coating to eliminate surface oxides and to prevent reoxidation. These steps include the etch and zincation processes described above. The zincation process is also described in this literature at page 5. The zinc barrier coating as stated herein is applied to prevent reoxidation of the cleaned aluminum surface.

The nickel layer 94 is deposited in the region of the core outside the polyimide layers auto-catalytically, that is without electric current, for 8 minutes at 85° C. employing the Enthone NI-424 system to a thickness greater than one micron. The nickel provides good adhesion to the zinc coating. The electrolytic copper layers 96, 96' are then deposited over the electroless nickel layers 94, 94', respectively. The electrolytic copper layers protect the core from the corrosive acid of the electroless bath that follows. The electrolytic copper layers are deposited as described above. The coated core is then baked at 100° C. for two hours as also described previously.

The hot core is then cooled to a temperature to below 150° F. and the polyimide insulation layers 86, 88 and 90 are now applied to recess 82. The polyimide layers comprising L-20N and L-30N EYMYD are sprayed via the procedure described above in connection with FIG. 4 until the desired thickness is reached. The final layer 90, a polyimide, which provides a smooth surface finish is then sprayed to provide the finished insulation coating. The polyimide surface is then modified as described above with an adhesion promoter and surface catalyzer.

Before the electroless layer 98 is applied to the modified polyimide layers and to the electrolytically deposited copper layers 96 and 96', the substrate is rinsed in water for two minutes. The electroless copper layer 98 is then applied as described above, and by way of example, is applied for 36 minutes in a 140 g/l copper sulphate pentahydrate ($CuSo_4 5H_2O$), 50 g/l sulfuric acid ($H_2SO_4$), 175 ppm hydrochloric acid (HCl), 3 percent by volume electro-chemicals, ElectroBrite PC 667 at room temperature employing 30 amps per square foot. This plating procedure is described more fully in copending application Ser. No. 402,372.

The electroless deposited layer is then heated as described previously for two hours at 110° C. and the electrolytically deposited layer 100 is then applied over the electroless deposited layer 98 also described previously. The electroless nickel layer is then applied over the electrolytic copper layer by treating the copper layer for two minutes at 0.1 percent by weight palladium chloride and 1 percent by volume hydrochloric acid at room temperature followed by a two minute water rinse. The the layer is deposited by exposing the substrate to eight minutes in Enthone ENPLATE® Ni-424 at 84° C. as described above. This is followed by a two minute water rinse and dried at 16 hours at 110° C.

The ENPLATE Ni-424 system is a high phosphorous content greater than nine percent by weight electroless nickel process designed for optimum corrosion protection with high build up applications. It has a moderate plating rate that produces a uniform nickel phosphorous alloy layer with minimal or no porosity. The nickel layer is non-magnetic, non-staining and can be exposed to 30 second nitric acid. The ENPLATE NI-424 process is proprietary to the Enthone Company.

What is claimed is:

1. A mold structure for forming an article from a heated, softened plastic material, said structure comprising:
   a mold core having a thermal conductivity in the range of about $1 \times 10^{-2}$ to $1 \times 10^{-1}$ cal/cm. sec. ° C. and having a mold cavity, said mold cavity having at least one surface which comprises a recessed portion and a non-recessed portion; and
   an insulating mold layer having a thermal conductivity in the range of about $1 \times 10^{-4}$ to $5 \times 10^{-3}$ cal/cm. sec. ° C. and formed in and filling said recessed portion so as to provide a substantially continuous surface.

2. The structure of claim 1 wherein said mold layer is selected from the group consisting essentially of epoxy, polytetrafluoroethylene, polysulfone, polyimide, polyamides, and polyamideimide.

3. The structure of claim 1 wherein said mold layer is selected from the group consisting of thermoplastics and thermoset plastic material.

4. The mold of claim 1 wherein said mold layer is a partially fluorinated aromatic diamine comprising respective first and second layers which are the respective condensation reaction products of 1) substantially equal molar amounts of one of pyromellitic dianhydride (PMDA) or 2) benzophenone tetracarboxylic acid dianhydride (BTDA) in N-methyl pyrrolidone (NMP) with an aromatic diamine structure as follows:

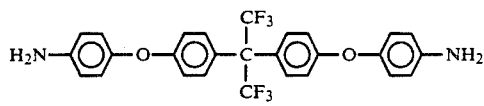

wherein the second layer is deposited next adjacent to the core and the first layer is deposited on the second layer.

5. The mold structure of claim 1 wherein said mold core is aluminum and said mold layer is a fluorinated diamine polyimide having the following structure:

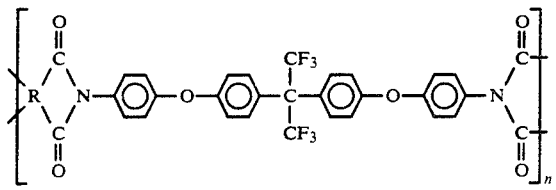

where n is an integer sufficient to provide a structure having an average molecular weight of at least 5000 and R is an organic radical of 5 to 22 atoms selected from the group consisting of tetravalent aliphatic radicals and tetravalent aromatic radicals.

6. The mold structure of claim 1 wherein said mold core is an iron alloy and said mold layer is a fluorinated diamine having the following structure:

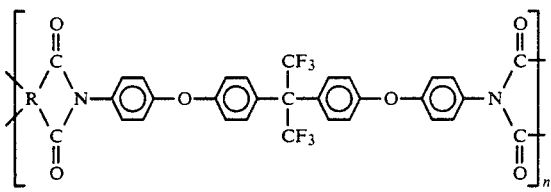

where n is an integer sufficient to provide a structure having an average molecular weight of at least 5000 and R is an organic radical of 5 to 22 atoms selected from the group consisting of tetravalent aliphatic radicals and tetravalent aromatic radicals.

7. The structure of claim 1 further including a metal skin layer bonded to said continuous surface so as to form a substantially continuous mold surface.

8. The structure of claim 7 wherein said metal skin layer has a thickness in the range of about 0.1 to 10 mils and said mold layer has a thickness in the range of about 5 to 20 mils.

9. The structure of claim 7 wherein said metal skin layer is made up of a layer of electroless Cu deposited over said continuous surface, a layer of electrolytic Cu deposited over said layer of electroless Cu, and a layer of Ni deposited over said layer of electrolytic Cu.

10. The structure of claim 7 wherein said metal skin layer is made up of a first layer of Ni deposited over said non-recessed portion of said at least one mold cavity surface, a first layer of electrolytic Cu deposited over said first layer of Ni, a layer of electroless Cu deposited over said first layer of electrolytic Cu and said insulating mold layer, a second layer of electrolytic Cu deposited over said layer of electroless Cu, and a second layer of Ni deposited over said second layer of electrolytic Cu.

11. The structure of claim 7 further comprising a protective metal layer disposed on said at least one mold cavity surface.

12. The mold structure of claim 1 wherein said mold core is metal having a given coefficient of thermal expansion (CTE), said mold layer comprises a fluorinated diamine having the following structure:

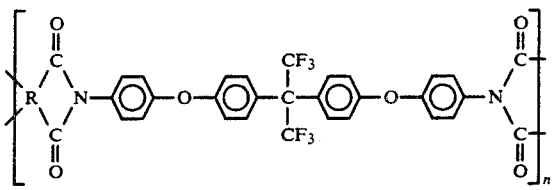

where n is an integer sufficient to provide a structure having an average molecular weight of at least 5000 and R is an organic radical of 5 to 22 atoms selected from the group consisting of tetravalent aliphatic radicals and tetravalent aromatic radicals;

said mold layer comprising first, second and third layers of said fluorinated diamine, the first layer having a composition so as to adhere to said core, the second layer including filler material to decrease its thermal conductivity over that of the first layer while changing its CTE to more closely match the CTE of said core, and the third layer comprising material the same as the second layer without the filler material to provide a smooth surface.

13. The mold structure of claim 12 wherein the filler material comprises hollow glass spheres.

14. The mold structure of claim 13 wherein the glass spheres have a mean particle size of 62 μm.

15. A mold structure for molding preheated thermoplastic into an article comprising:
 a core having a surface with the general contour of the article to be molded, said core including cooling means;
 an insulating layer bonded to a portion of said contoured surface of said core for slowing initial cooling of the preheated thermoplastic during molding in the region of said portion; and
 a continuous metal skin having the contour and surface characteristics of the finished article bonded to and over the insulating layer and to and over the remaining portion of said core surface not covered by said insulating surface.

16. The mold structure of claim 15 wherein the insulating layer comprises a thermoplastic material.

17. The mold structure of claim 16 wherein the thermoplastic material comprises a fluorinated diamine having the following structure:

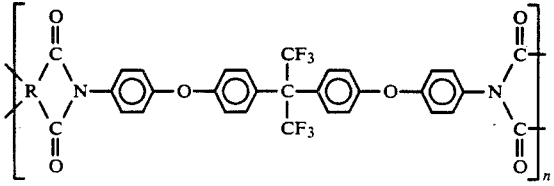

where n is an integer sufficient to provide a structure having an average molecular weight of at least 5000 and R is an organic radical of 5 to 22 atoms selected from the group consisting of tetravalent aliphatic radicals and tetravalent aromatic radicals.

18. The mold structure of claim 17 wherein the core normally has a thermal coefficient of expansion different than the insulating layer and the insulating layer comprises a first layer of fluorinated aromatic diamine having said structure and a composition to enhance the adherence of said diamine to said core, a second layer of said diamine over the first layer arranged with a filler to more closely match the thermal coefficient of expansion of the core and a third layer of said diamine over the second layer for providing enhanced smoothness to said insulating layer.

19. The mold structure of claim 18 wherein said skin layer includes an abrasive resistant metal layer and at least one metallic layer for bonding the abrasive resistant layer to the insulating layer.

* * * * *